Patented Feb. 4, 1930

1,745,591

UNITED STATES PATENT OFFICE

EDWARD D. VAN TASSEL, JR., OF SWAMPSCOTT, MASSACHUSETTS, ASSIGNOR TO VAN TASSEL SOLE & LEATHER CORPORATION, OF NORWICH, CONNECTICUT, A CORPORATION OF MAINE

TREATING LEATHER-IMPREGNATING MATERIAL

No Drawing. Application filed June 12, 1926. Serial No. 115,682.

The present invention relates to an improvement in water-proofing leather, particularly leather tanned with chromium compounds (either alone or in conjunction with vegetable tanning agents), by the employment of molten mixtures including paraffin wax and a rubber-like water-insoluble gummy material. As examples of the latter class of materials, raw rubber, waste rubber (vulcanized or not), gutta-percha and the like are particularly referred to.

It was proposed in British Patent 1962 of 1865, to employ a mixture of rubber or gutta-percha and beeswax or paraffin wax, for impregnating leather, and in accordance with the description of such process, the two materials, namely the gum and the wax were melted together at a temperature of 220° F. up to 240° F. or in any event at temperatures not above 260° F., and so far as I have been advised, the process never came into commercial use, and experiments have shown that with such mixtures, heated even to such maximum temperature stated in said patent, viz: 260° F. (127° C.) the viscosity of the mixture is so high, at temperatures of 90 to 95° C., that the mixture will not readily penetrate to any substantial extent into leather.

More recently it was proposed to employ paraffin wax and rubber, heated to temperatures of about 150° C., under which conditions it was found that the viscosity of the mixture, at the temperature at which the rubber-paraffin mixture was to be brought into contact with the leather, was lowered to such an extent as to permeate the leather to a sufficient extent.

I have now found that it is possible to still further reduce the viscosity, and to accordingly increase the capacity of the mixture for impregnating leather, by suitable mechanical treatments of such mixture. The mechanical treatment which has given most satisfactory results in practice is to pass the said mixture, while in a molten state, through a colloid mill. Other treatments such as passing the said mixture, while molten, through a homogenizer under high pressure, and even heating to temperatures of 150° C. or higher for a protracted period also are capable of considerably improving the penetrating qualities of the mixture. By heating the mixture several times to 150° C. or to temperatures somewhat above this, say 160 or 170° C., with alternate cooling to solidification, is also found to somewhat improve the penetrative qualities of the said mixture.

As illustrating the effect of heat upon the viscosity, it is stated that with a mixture of 85% paraffin wax and 15% rubber, which has been heated only to 127° C., the viscosity (measured on a Scott viscosimeter) was about 7000 seconds, whereas with the same mixture after heating to about 150° C., the viscosity had dropped to about 480 seconds. It will be understood that the viscosities, as referred to herein, are measured by the number of seconds required for a given volume (50 c. c.) of the molten material at a stated temperature, to flow out through a small tube, so that a high number represents a high viscosity.

Samples of the above mixture, made up in the proportions of 85% paraffin wax to 15% rubber, were passed through colloid mills, at a temperature of 150° C., with the following results:—

*Colloid mill treatment at 150° C.*

15 inch mill__ .010 inch clearance__Viscosity 387 seconds
15 inch mill__ .002 inch clearance__Viscosity 340 seconds
10 inch mill__ .002 inch clearance__Viscosity 337 seconds
10 inch mill__ .010 inch clearance__Viscosity 425 seconds The above figures compare with the viscosity of 480 seconds of the same material not passed through the colloid mill.

It will be understood that the percentage of rubber in the mixture can be substantially varied, and the resulting viscosity will be approximately in proportion to the percentage of rubber in the mixture.

For the purpose of comparison, all of the viscosities referred to in the present case were measured at 90° C., which is about the temperature preferably used in impregnating the leather, although this impregnation operation can be carried on at temperatures a little higher than this, but preferably temperatures of over 100° C. are not employed in the impregnation operation. It will be understood that any of these materials at 95° C. have a slightly lower viscosity than at 90° C.

It will be understood that proportions of rubber considerably above 15% can be employed, for example I may employ mixtures containing 25 to 30% or even more of rubber, which are particularly useful with thin leather such as is used for making shoe uppers.

It will be understood that the impregnation can be partial or complete, and even a partial impregnation may very considerably increase the flexibility of the leather, particularly chrome tanned leathers as above referred to.

It may be noted that in both the colloid mill treatment and the treatment with a homogenizer, the mixture is forced through extremely fine openings, while in a molten state, which operation I believe is of importance in increasing the penetrating qualities of the material, and lowering the viscosity thereof.

While I have particularly referred to passing the mixture through the colloid mill or through the homogenizer at a temperature of about 150° C., it will be understood that temperatures somewhat higher than this can be employed, although obviously temperatures which would injure the rubber chemically should be avoided. Temperatures somewhat lower than 150° C., likewise can be employed, with some improvement of the penetrating qualities of the mixture.

I have above referred to mixtures consisting of paraffin wax and rubber only. It will be understood that the addition of resins, other gums, waxes, fats, drying or non-drying oils, coloring matters and the like is not precluded. The amounts of the latter if added, should preferably not be such as to greatly modify the physical consistency of the material which should, at normal room temperature be a relatively firm waxy solid, and not a fluid or paste or jelly or thin greasy mass.

I claim:—

1. A process of treating a mixture including paraffin wax and a water-insoluble rubbery gum, which comprises subjecting such mixture, while in a molten state, to a mechanical treatment capable of lowering the viscosity thereof and capable of increasing the permeability thereof to a degree greater than would be effected by once heating the mixture to 150 C., all without heating sufficiently to substantially injure the properties of the rubber.

2. A process of treating a mixture including paraffin wax and a water-insoluble rubbery gum, which comprises passing such mixture through an extremely fine opening, while in a molten state, all without heating sufficiently to substantially injure the properties of the rubber.

3. A process of treating a mixture including paraffin wax and a water-insoluble rubbery gum, which comprises passing such mixture while in a flowable state through an extremely fine opening, while under substantial superatmospheric pressure, all without heating sufficiently to substantially injure the properties of the rubber.

4. A process which comprises subjecting to a homogenization treatment under substantial superatmospheric pressure, a molten mixture comprising paraffin wax and a rubber-like gum, all without heating sufficiently to substantially injure the properties of the rubber.

5. A process which comprises passing a molten mixture containing paraffin wax and a water-insoluble rubber-like gum, through a colloid mill.

6. A process which comprises passing a molten mixture containing paraffin wax and a water-insoluble rubber-like gum, through a colloid mill while at about 150° C.

7. A process which comprises subjecting a molten mixture containing a rubber-like water-insoluble gum and paraffin wax, to violent mechanical agitation while passing the same through a fine opening.

8. In the impregnation of leathery material, with a molten mixture containing paraffin wax and a rubber like gum, the preliminary treatment of such mixture by passing, while molten, through a colloid mill.

9. In the impregnation of leathery material with a molten mixture containing paraffin wax and a rubber-like gum, the preliminary treatment of such mixture by passing same, while molten, through extremely fine openings.

10. A mixture of the character described suitable for impregnating leather, containing paraffin wax and a water-insoluble rubber-like gum, the viscosity of such mixture at 95° C., corresponding to not substantially above 340 seconds, based on a 15% content of said rubber-like gum.

11. A mixture of the character described suitable for impregnating leather containing paraffin wax and a water-insoluble rubber-like gum, the viscosity of such mixture at 95° C., corresponding to substantially below 480 seconds.

12. A mixture containing paraffin wax and a rubber-like gum which when molten has a low viscosity such as would result from mechanical attrition, such viscosity being substantially lower than that which would result from merely heating the mixture once to 150° C.

13. A rubber and paraffin mixture containing about 15% of rubber, and having a viscosity at 90° C., substantially below 480 seconds (Story).

14. A rubber and paraffin mixture containing about 15% of rubber, and having a viscosity at 90° C., not substantially above 425 seconds (Story).

15. A rubber and paraffin mixture in which the paraffin is the major constituent, having a viscosity sufficiently low to readily permeate sole leather to the center, and having a viscosity lower than would be imparted by once heating to 150° C., and free from such decomposition products of rubber as would be produced by heating same to 275° C.

16. A process which comprises mechanically wearing down a mixture of a rubber-like gum and paraffin, sufficiently to reduce its viscosity.

17. A process which comprises subjecting a hot mixture of a rubber-like gum and paraffin wax, to attrition sufficiently to lower its viscosity.

In testimony whereof I affix my signature.

EDWARD D. VAN TASSEL, Jr.